Patented July 10, 1945

2,380,126

UNITED STATES PATENT OFFICE 2,380,126

MARKING CRAYON

Fred A. Sturm, Paterson, N. J.

No Drawing. Application September 11, 1941,
Serial No. 410,373

7 Claims. (Cl. 260—738)

The present invention relates to a marking crayon, and it particularly relates to a marking crayon for textile use which will leave a substantially indelible mark resistant to dilute acids or alkalies, and which will substantially retain its original color, resisting any covering by dyestuffs during the dyeing process, whether acid or neutral, ranging in temperature from the atmospheric to prolonged boiling temperatures.

Considerable difficulty has been experienced in marking textile fabrics, particularly where such fabrics are not in completely finished state and must be subjected to treating baths of an acid or alkali nature since such markings even though indelible frequently will run or fade or be slightly destroyed by the acid or alkali, or other chemicals, or even hot or boiling water as the case may be.

It is among the objects of the present invention to provide an improved marking crayon particularly adapted for textile utilization, but also having wider application which will enable ready marking of textile fabrics in the greige or unfinished state, and before washing or treatment with alkaline or acid fluids and which will assure a substantially permanent durable marking thereon.

Another object is to provide an improved crayon composition which may be widely utilized to produce permanent markings which will not readily wear away or be destroyed by weather, wearing, or treatment with usual chemicals.

Other objects and advantages will appear from the more detailed description set forth below; it being understood, however, that this more detailed description is given by way of illustration since various changes therein may be made by those skilled in the art without departing from the scope and spirit of the invention.

In accomplishing the above objects it has been found most desirable to form the crayon of a dispersed resin particles or globules carrying pigment and also if desired a plasticizer or softener, which particles or globules are suspended in or distributed through or surrounded by a continuous phase of wax having sufficient consistency to leave a film upon the fabric or other surface to be marked and which at the same time will not soften under summer temperatures nor become too rigid during the winter, and which will not be affected by humidity or dampness.

It has been found most suitable according to one embodiment of the present invention to provide a dispersion of a pigment in a resin which is resistant to dilute acid and dilute alkali such for example as chlorinated rubber, polymerized di-olefines, such as butadiene, balata or gutta percha. In the preferred form each pigment particle is distributed in the resin and may be coated by the resin so as to be resistant to acid or alkali, these resinous materials having the coating so thin as not to affect the brilliancy of the pigment particle, but at the same time so that the pigment particle is completely coated by the resinous material. The pigments may be ground into the resin in liquid or paste form, or dispersed in the liquid resin, either in molten condition or in solution in an organic volatile solvent, such as acetone.

These resin coated pigment particles may then be suspended in desired proportions or formed with desired proportions with a body of wax. The proportions being so regulated as to give the desired rigidity and strength and also to permit a satisfactory detachment of a film of sufficient thickness when the crayon is drawn over a surface.

Although the rubber-like resinous materials are preferred, it is also possible to use in lieu of or in addition thereto similar acid or alkali resistant synthetic plastics or resins, such as acrylic resins, styrene resin, vinylite resins, urea-formaldehyde, alkyd resins, phenol-formaldehyde, coumarone resin, or analogous substances such as ethyl cellulose, cellulose nitrate, cellulose acetate, etc.

Among the waxes which may be utilized are carnauba, beeswax, candelilla wax, paraffin, montan wax, stearic acid, ceresin, spermaceti, Japan wax, tallow, hydrogenated oils, high melting point cocoanut stearins, ozokerite, etc.

Among the various pigments which have been found satisfactory to be incorporated in the resin and to be coated by the resin, preferably before incorporation in the wax are cadmium red or yellow, chrome yellow, chrome green, titanium white, iron oxide red, barium sulphate, zinc sulphide, red lead, basic lead sulphate, Prussian blue, burnt amber, yellow ochre, organic lacs, i. e. precipitated organic dyes, powdered aluminum hydrate and carbon black or desired combinations thereof. It is also desirable to use oil soluble or dispersable dyes. In some instances it is possible to use colored resins which will act as the coloring material.

Desirably, the resin is plasticized by a high boiling point solvent, such as diethyl phthalate, ethyl or butyl lactate, ethyl or butyl abietate, tri-phenyl or tri-cresyl phosphate, etc., so that the particles thereof will smear smoothly upon the surface and will form a thin film. The entire composition should be adjusted that the mark when made will dry promptly if not already dry when applied.

It has been found that the wax may range from 20% to 70% of the composition, the wax being proportioned so as to regulate the brittleness, elasticity and tendency toward oxidation of the composition.

Various composite waxes may be utilized such as Japan wax, and ozokerite with or without addition of spermaceti, etc. Petrolatum or a mineral oil may also be included to soften the composition. Drying or non-drying oils, fats, and waxes such as rapeseed oil, linseed oil, lithographic varnish tung oil, China-wood oil, and turpentine may also be introduced to give the desired consistency.

Desirably, the above compositions are mixed by melting them or by use of volatile organic solvents. In one process the pigment is stirred into the molten resin or resin and wax which is then solidified and cast or cut or formed into crayon sticks or rods ready for use.

To give another example, with a volatile solvent, 5 parts by weight of pigment may be mixed with 10 parts by weight of the resin itself in a volatile solvent such as naphtha or acetone together with 1/20 to 1.10 parts of a plasticizer and 1/20 to 1/10 part of a stabilizer, and after the solvent has been evaporated forming a coating upon the particles, the mixture may then be combined with say 10 parts of a wax composition of equal parts of weight of beeswax and spermaceti.

The amount of resin in the final composition may vary widely and for example the resin may constitute as much as 20% to 50% of the final composition, with the pigment consisting of 5% to 20% of the composition, the balance being wax.

As still another composition the pigment may be dispersed by stirring in a volatile organic solvent containing from 10% to 15% of a high boiling point solvent and then into the solvent may be dissolved from 10 to 20 parts of a wax, and from 10 to 30 parts of a rubber-like resin as above stated. When the volatile solvent has been removed the final composition may be then worked into wax sticks useful as crayon, and the resin and wax composition be regulated so as to give the final product the advantage of hardness and weather-resistant properties.

As a further example there may be used the following compositions:

| | | |
|---|---|---|
| Carnauba wax | pounds | 10 |
| Barium sulphate | do | 10 |
| Cadmium selenide | do | 9 |
| Coumarone resin | do | 10 |
| Diethyl lactate | ounces | 2 |

The resin and wax are melted together or the resin is dissolved in a solvent and then the barium sulphate and cadmium selenide are stirred in. The diethyl lactate is added at any state.

Soap, sodium lauryl sulphate, triethanolamine linoleate, mono or di-glyceryl stearates, palmitates or oleates may also be added in amounts varying from 1% to 5% as homogenizing agents.

Glue, casein, gelatin, molasses, gums, such as gum arabic or tragacanth, pectin, dextrin, starch, etc., may also be included in small amounts ranging from 2% to 8%.

Fillers, such as clay or kaolin, calcium carbonate, chalk, whiting, kieselguhr, diatomaceous earth, barium sulphate, talc, soapstone, etc., may also be included.

If desired, instead of, or in lieu of the waxes or wax to make the crayons softer or more smearable, it would be possible to use wax-like resins or gums, or to use such resins with other resins to give the desired composition which will be markable yet not too soft on one hand and not to brittle or hard on the other hand.

As further examples of compositions which may be employed:

*Example IV*

| | Parts by weight |
|---|---|
| Coumarone resin | 16 |
| Rubber chloride (Tornesit) | 12 |
| Blown rapeseed oil | 12 |
| Beeswax | 35 |
| Paraffin | 25 |
| Ethyl cellulose | 12 |
| Triethanol linoleate | 10 |
| Solvent (bityl carbitol) | 15 |
| Ethyl lactate | 2 |
| Ultramarine blue | 5 |

*Example V*

| | Parts by weight |
|---|---|
| Phenol-formaldehyde (Amberol) | 25 |
| Polybutene polymer (Vistanex) | 25 |
| Beeswax | 40 |
| Carnauba wax | 50 |
| Castor oil | 5 |
| Lithographic varnish | 10 |
| Cobalt drier | 2 |
| Ethyl acetate | 2 |
| Soap (emulsifying agent) | 4 |
| Cadmium yellow | 20 |
| Tricresyl phosphate | 5 |

*Example VI*

| | Indelible |
|---|---|
| Stearic acid | 10 |
| Paraffin | 10 |
| Coumarone resin | 20 |
| Carnauba | 3 |
| Beeswax | 5 |
| Induline blue base | 3 |

*Example VII*

| | |
|---|---|
| Pyroxylin lacquer | 10 |
| Ethyl oleate | 10 |
| Sodium oleate | 5 |
| Carnauba wax | 20 |
| Beeswax | 10 |
| Chlorinated naphthalene | 15 |
| Toluol | 5 |
| Victoria blue B dye | 15 |

*Example VIII*

| | Parts by weight |
|---|---|
| Urea-formaldehyde resin | 40 |
| Isobutanol | 20 |
| Bronze powder | 12 |
| Polymerized vinyl acetate | 20 |
| Carnauba wax | 20 |
| Paraffin | 25 |
| Ethyl abietate | 15 |
| Turpentine | 5 |

If desired, after the crayon has been utilized to make a mark upon the fabric or textile material a hot iron may be run over the textile to cause the wax or resin to melt onto or into, or to form a better union with the textile fibers.

Desirably, after the wax has been removed either prior to the time the fabric is subjected to the action of dyeing and finishing bath or during the subjection of the fabric to dyeing and finishing baths, the resins should firmly adhere to the textile fibers causing permanent adherence of the pigments thereto so that the mark which is formed is a permanent mark and will not be removed by boiling nor will it be covered by dye baths, even though the dyeing solution be boiled for long periods of time as is customary in many forms of wool dyeing.

Where it is desired to have the resin harden or dry upon the textile fibers, a drying oil or a drying oil acid may be incorporated in the resin as for example in an alkyd resin embodying linoleic acid or linolenic acid or eleostearic acid. The wax compositions and ingredients acting as a vehicle for the pigment and resin should always be so adjusted that the crayon will leave a film of desired thickness upon the fabrics, and a desirably low melting point wax, such as paraffin, and high melting point wax, such as carnauba wax should be used to achieve the desired mixture. The resin or cellulose derivative should not be antagonistic to the wax and desirably adhere permanently to the textile fabric holding the dye or pigment in permanent position thereon, even though the wax be melted away from the resin or pigment or be removed by the hot washing or treating liquids. Where the resin in the wax does not readily mix in molten condition, a better mixture may be prepared by adding a small amount of an emulsifying agent, such as triethanolamine stearate or oleate, or sodium lauryl sulphate which will assure a better combination or emulsification of the resin in the wax. Lecithin may also be used for this purpose.

It will be noted, that the application above identified by the above composition has achieved a crayon which although it readily smears upon a textile fabric to form a marking thereon, will nevertheless form a permanent marking due to the action of the resin in holding the pigment firmly onto the textile fabric so that the color of the mark cannot be removed in prolonged treatment of dye baths even where the dyeing baths have contrasting colors which would ordinarily mask the color of the crayon. For example, where a yellow mark is placed upon the bottom edge of a woolen fabric which is then subjected to prolonged boiling in a dye bath to dye the fabric either a dark blue or black, the yellow color will remain intact, and after the finishing has been completed the only convenient way to remove such mark is to cut off the yellow end. In this manner assurance can be had that the fabric will be marked from the greige state all the way down to the finished material. These markings can be depended upon to supply an identification of the piece throughout the textile operations thereon, whether in wet or dry condition.

The present invention eliminates the necessity of using viscous, slow drying markings which must be permitted to dry and harden upon the fabric before the fabric can be subjected to any processing, and which cannot be readily handled in a textile plant since they frequently require the use of expensive collapsible metal tubes.

It is to be understood that the invention is not intended to be restricted to any particular composition or proportions, or to any particular application, or to any specific manner of use or to any of the various details thereof, herein described, as the same may be modified in various particulars or be applied in many varied relations without departing from the spirit and scope of the claimed invention, the practical embodiments herein described merely showing some of the various features entering into the application of the invention.

What is claimed is:

1. A marking crayon for textiles undergoing processing comprising a composition containing pigment, a chlorinated rubber, a high boiling plasticizer solvent and a wax, said pigment being dispersed in said composition and coated by said chlorinated rubber and said wax preponderating over the chlorinated rubber content, said crayon forming a mark upon a textile which will remain thereon without substantial removal and masking even though the fabric be subjected to prolonged boiling treatments in finishing and dyeing baths, in the acid or alkali baths, and said marking resulting in an attachment of the pigment to the textile by the chlorinated rubber after removal of the wax, which chlorinated rubber not only serves as a permanent adhesive attachment to the pigment but also protects the pigment against masking from any chemical.

2. A marking crayon for marking textiles undergoing processing, comprising a composition containing a resin from the group consisting of acid, alkali and both acid and alkali resistant resins, a wax material, and a pigmenting substance, said pigmenting substance being incorporated in said resin, the proportion of said wax material being between 20 and 70% of the crayon composition.

3. A marking crayon comprising a resin from the group consisting of acid, alkali, and both acid and alkali resistant resins, a coloring substance, and a wax, said coloring substance being admixed with and incorporated in said resin acting as a coating for said coloring substance, said wax being a vehicle for said mixture of resin and coloring substance and adapted to provide requisite crayon marking properties, the proportion of said wax being at least equal to the resin content.

4. A marking crayon for marking textiles undergoing processing comprising a resin from the group consisting of acid, alkali, and both acid and alkali resistant resins, a pigment, a wax, and at least one substance from the group consisting of plasticizers, softeners, and homogenizing substances adapted to provide the crayon composition with predetermined marking characteristics for textile materials, said pigment being substantially dispersed within said resin and coated thereby, and said wax being a vehicle for said mixture of resin and pigment and in an amount at least equal to the resin content.

5. A marking crayon comprising an acid and alkali resistant resin, pigmentary particles homogeneously admixed with and coated by said resin, a wax in sufficient quantity to provide a vehicle for said resin and pigment mixture and in an amount at least equal to said resin, and at least one substance from the group consisting of plasticizers, softeners, and homogenizing substances adapted to provide the crayon composition with predetermined marking characteristics for textile materials.

6. A marking crayon comprising an acid and alkali resistant resin, a coloring substance intimately associated with and coated by said resin, and a vehicle for the resin and pigment comprising a wax having predetermined marking characteristics, the proportion of said wax being at least equal to the resin content.

7. A marking crayon comprising an acid and alkali resistant resin, coloring particles intimately admixed with and coated by said resin, and a vehicle for the resin and pigment comprising a wax having predetermined marking characteristics for textile materials, said resin content being in the proportion of 20–50% of the composition, said pigment in the proportion of 5–20%, and said wax in the proportion of 20–70% and at least equal to the resin content.

FRED A. STURM.